(12) United States Patent
Cheng et al.

(10) Patent No.: US 9,083,994 B2
(45) Date of Patent: Jul. 14, 2015

(54) METHOD AND SYSTEM FOR ERROR ROBUST AUDIO PLAYBACK TIME STAMP REPORTING

(75) Inventors: Mingxia Cheng, San Diego, CA (US); Anthony Patrick Mauro, II, San Diego, CA (US); Eddie L. T. Choy, Carlsbad, CA (US); Yujie Gao, San Diego, CA (US); Kuntal Dilipsinh Sampat, San Diego, CA (US); Matthew Blaine Zivney, San Diego, CA (US); Satish Goverdhan, San Diego, CA (US); Samir Kumar Gupta, San Diego, CA (US); Harinath Garudadri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1615 days.

(21) Appl. No.: 11/535,406

(22) Filed: Sep. 26, 2006

(65) Prior Publication Data

US 2008/0074542 A1 Mar. 27, 2008

(51) Int. Cl.
*G06F 17/00* (2006.01)
*H04N 21/2368* (2011.01)
*G10L 19/005* (2013.01)
(Continued)

(52) U.S. Cl.
CPC .......... *H04N 21/2368* (2013.01); *G10L 19/005* (2013.01); *H04N 19/436* (2014.11); *H04N 19/68* (2014.11); *H04N 19/89* (2014.11); *H04N 21/4307* (2013.01); *H04N 21/439* (2013.01); *H04N 21/4341* (2013.01); *H04N 21/4425* (2013.01); *H04N 21/44204* (2013.01); *H04N 21/8106* (2013.01)

(58) Field of Classification Search
CPC .......... G11B 2020/10694; G06F 3/16; H04N 21/2368
USPC ........................................... 700/94
See application file for complete search history.

(56) References Cited

U.S. PATENT DOCUMENTS 5,515,296 A * 5/1996 Agarwal ................. 709/204
5,703,877 A * 12/1997 Nuber et al. ............. 370/395.64
(Continued)

FOREIGN PATENT DOCUMENTS

CN 1160328 9/1997
EP 0527636 2/1993
(Continued)

OTHER PUBLICATIONS

International Search Report—PCT/US07/084596, International Search Authority—European Patent Office—Jun. 5, 2008.
(Continued)

*Primary Examiner* — Paul McCord
(74) *Attorney, Agent, or Firm* — George C. Pappas; Espartaco Diaz Hidalo

(57) ABSTRACT

A method and system for resynchronizing an embedded multimedia system using bytes consumed in an audio decoder. The bytes consumed provides a mechanism to compensate for bit error handling and correction in a system that does not require re-transmission. The audio decoder keeps track of the bytes consumed and periodically reports the bytes consumed. A host microprocessor indexes the actual bytes consumed since bit errors may have been handled or corrected to a predetermined byte count to determine whether resynchronization is necessary.

45 Claims, 7 Drawing Sheets

(51) Int. Cl.
*H04N 21/43* (2011.01)
*H04N 21/434* (2011.01)
*H04N 21/439* (2011.01)
*H04N 21/442* (2011.01)
*H04N 21/4425* (2011.01)
*H04N 21/81* (2011.01)
*H04N 19/89* (2014.01)
*H04N 19/436* (2014.01)
*H04N 19/68* (2014.01)

(56) References Cited

U.S. PATENT DOCUMENTS

| | | | | |
|---|---|---|---|---|
| 5,838,874 | A * | 11/1998 | Ng et al. | 386/318 |
| 6,101,195 | A * | 8/2000 | Lyons et al. | 370/498 |
| 6,125,398 | A * | 9/2000 | Mirashrafi et al. | 709/236 |
| 6,359,479 | B1 | 3/2002 | Oprescu | |
| 6,363,207 | B1 * | 3/2002 | Duruoz et al. | 386/68 |
| 6,512,552 | B1 * | 1/2003 | Subramanian | 348/564 |
| 6,912,010 | B2 * | 6/2005 | Baker et al. | 348/515 |
| 6,977,980 | B2 | 12/2005 | Chang et al. | |
| 7,100,188 | B2 * | 8/2006 | Hejna, Jr. | 725/100 |
| 7,107,111 | B2 * | 9/2006 | Van De Kerkhof et al. | 700/94 |
| 7,227,899 | B2 * | 6/2007 | Balakrishnan et al. | 375/240.26 |
| 7,335,576 | B2 * | 2/2008 | David et al. | 438/462 |
| 7,392,417 | B2 | 6/2008 | De Groot et al. | |
| 7,539,130 | B2 * | 5/2009 | Le et al. | 370/216 |
| 8,335,576 | B1 | 12/2012 | Bradshaw et al. | 700/94 |
| 2002/0048450 | A1 * | 4/2002 | Zetts | 386/95 |
| 2003/0007780 | A1 * | 1/2003 | Senoh | 386/68 |
| 2003/0099196 | A1 * | 5/2003 | Sebire | 370/230 |
| 2003/0161614 | A1 * | 8/2003 | Yanagihara et al. | 386/95 |
| 2004/0148382 | A1 * | 7/2004 | Narad et al. | 709/223 |
| 2004/0228367 | A1 * | 11/2004 | Mosig | 370/503 |
| 2005/0166135 | A1 * | 7/2005 | Burke et al. | 715/500.1 |
| 2005/0195750 | A1 * | 9/2005 | Le et al. | 370/252 |
| 2005/0226601 | A1 * | 10/2005 | Cohen et al. | 386/75 |
| 2005/0283262 | A1 * | 12/2005 | Puryear | 700/94 |
| 2006/0013208 | A1 * | 1/2006 | Rietschel et al. | 370/389 |
| 2006/0029139 | A1 * | 2/2006 | Teichner et al. | 375/240.28 |
| 2006/0069457 | A1 * | 3/2006 | Malani et al. | 700/94 |
| 2007/0242683 | A1 * | 10/2007 | Pelletier et al. | 370/401 |
| 2008/0008281 | A1 * | 1/2008 | Abrol et al. | 375/359 |
| 2008/0056273 | A1 * | 3/2008 | Pelletier et al. | 370/395.21 |

FOREIGN PATENT DOCUMENTS

| | | |
|---|---|---|
| EP | 0776134 | 5/1997 |
| JP | 2000278354 A | 10/2000 |
| JP | 2001025014 A | 1/2001 |
| JP | 2002247565 A | 8/2002 |
| JP | 2003316397 A | 11/2003 |
| JP | 2005502921 A | 1/2005 |
| JP | 2007508749 A | 4/2007 |
| KR | 20050056211 | 6/2005 |
| WO | WO03023785 A2 | 3/2003 |
| WO | 2008006080 | 1/2008 |

OTHER PUBLICATIONS

Written Opinion—PCT/US07/084596, International Search Authority—European Patent Office—Jun. 5, 2008.
International Search Report—PCT/US07/079595—International Search Authority, European Patent Office, Apr. 18, 2008.
Noll, P.: "Audio Coding: From Broadcast Standards to Advanced Audio Coding" ITG-Fachberichte, Vde Verlag, Berlin, DE, Mar. 1998, pp. 13-21.
Written Opinion—PCT/US07/079595, International Search Authority—European Patent Office—Apr. 18, 2008.

* cited by examiner

METHOD AND SYSTEM FOR ERROR ROBUST AUDIO PLAYBACK TIME STAMP REPORTING

BACKGROUND OF THE INVENTION

1. Field of the Invention

The present invention is directed to an audio time stamp representation used for synchronization purposes in the field of embedded multimedia systems.

2. Background

In a multiprocessor system, computation intensive tasks such as audio decoding are usually done in a separate processor, such as a digital signal processor (DSP), while task handling such as audio/video synchronization is handled by the host microprocessor. The host microprocessor, such as an Advanced RISC Machine (ARM), needs time stamp reporting from the audio decoder for multiple purposes, such as audio/audio sync, audio/video sync, and audio playback time display.

The Transmission Control Protocol (TCP) guarantees reliable and in-order delivery of data from a sender to a receiver. But it requires re-transmission overhead (causing bandwidth waste) and also the extra delay for buffering up at the receiver may cause interruption to real time playback of audio or video. The TCP is not usually used for multimedia streaming.

As another protocol, the User Datagram Protocol (UDP) uses a checksum, such as a cyclical redundancy check (CRC), to address error correctness of the data. The UDP Lite only uses a checksum for sensitive header data, and allows the codec to handle error corrupted data. As such, the UDP Lite is faster but may result in bit errors being undetected and sent to the audio or video codec. Most original equipment manufacturers (OEM) require the UDP for mobile device streaming due to the fact that it is faster and does not have the re-transmission bandwidth overhead, and most audio/video codecs can handle bit errors to some extent.

For example, QUALCOMM's MediaFlo broadcast system uses a proprietary protocol that does not allow re-transmission, so the audio/video codec may receive an erroneous bitstream. In general, for a multimedia streaming system that uses the UDP Lite or other "best-effort" (un-reliable) protocols, the audio/video codec may receive erroneous bitstream data that is not detectable in the upper layer.

A conventional way of reporting the time stamp is to have the audio decoder report the playback time or audio frame number to the host microprocessor. However, when audio packets have errors, the reported time stamp is erroneous.

Most video coding standards have timestamp information embedded within the bitstream which can be advantageously used by the host microprocessor to maintain audio-video synchronization. However, such timestamps are typically not available in audio coding standards.

For a packed audio bitstream that uses variable length coding scheme such as Huffman coding, when the bitstream is corrupted, the audio decoder loses accurate bitstream boundary information and will no longer be able to report accurate time stamps to the host microprocessor. The inaccurate reporting ensues since the audio decoder will generally consume more or less bitstream data when a bit error is encountered in the packet. As a result, the playback time will be out of sync with the bitstream consumption rate. When the host microprocessor uses the reported erroneous audio playback time for synchronization or any other purposes, the cumulative nature of the errors can make it impossible to resynchronize correctly.

In view of the foregoing, it is desirable to provide an error robust reporting method and embedded multimedia system which achieve accurate time stamp reporting back to the host microprocessor for improved system synchronization.

It is further desirable to provide an error robust reporting method for use in a multimedia system that compensates for the cumulative nature of errors in an audio bitstream.

It is further desirable to provide an error robust reporting method that compensates for the cumulative nature of errors in a multimedia system that uses a protocol that does not require re-transmission.

Furthermore, it is desirable to provide an error robust reporting method which can be used in multimedia systems that uses the UDP Lite or other "best-effort" (un-reliable) protocols.

SUMMARY OF THE INVENTION

In view of the above, it is an object of the present invention to provide an error robust reporting method and embedded multimedia system which achieve accurate time stamp reporting back to the host microprocessor for improved system synchronization.

A further object of the present invention is to provide an error robust reporting method for use in a multimedia system that compensates for the cumulative nature of errors in an audio bitstream.

Another object of the present invention is to provide an error robust reporting method that compensates for the cumulative nature of errors in a multimedia system that uses a protocol that does not require re-transmission.

Yet another object of the present invention is to provide an error robust reporting method that can be used in multimedia systems that uses the UDP Lite or other "best-effort" (un-reliable) protocols.

The foregoing and other objects of the present invention are carried out by a multimedia system having multiple processors comprising: an audio decoder operable to decode an audio bitstream, count bytes consumed by the audio decoder, and report the count of the bytes consumed; and a host microprocessor operable to resynchronize the system based on the count of the bytes consumed.

The audio decoder also includes a sample counter operable to count a number of decoded samples of the audio bitstream played out by a speaker. The report also sends the count of the sample counter.

The host microprocessor includes a bitstream assembling module operable to assemble and communicate a bitstream and write a call back interval to memory for use by the audio decoder. The call back interval is a function of the number of the decoded samples and indicates the frequency in which the report is sent to the host microprocessor.

The host microprocessor includes a look-up-table (LUT) having a predetermined byte count and a predetermined audio playback time associated with the predetermined byte count. An error-robust playback time stamp report cross referencing module is used to cross reference the count of the bytes consumed and the predetermined byte count indexed in the LUT.

The host microprocessor is responsive to a user input command to fast forward, rewind, or stop, wherein in response to the user input command to fast forward or rewind, the system resets the count of the bytes consumed in the audio decoder and the sample counter and reconstructs the LUT.

In operation, the resynchronization includes resynchronization of a playback time display indicative of an audio playout of the decoded audio bitstream. Also, resynchronization of a video stream related to the audio bitstream may be required.

The audio decoder is compatible with at least one of windows media audio, an advanced audio coding (AAC) decoder, an AAC Plus decoder, an enhanced AAC plus decoder (eAAC+), MP3, and Real Audio bitstream formats.

In another aspect, the present invention is directed to a method of resynchronizing a multimedia system comprising the steps of: decoding an audio bitstream by an audio decoder and counting bytes consumed during the decoding; reporting a count of the bytes consumed to a host microprocessor; processing a reported bytes consumed; and resynchronizing the system based on the reported bytes consumed.

In yet another aspect, the present invention is directed to an audio decoder for use in an embedded multimedia system and which is operable to decode an audio bitstream, count bytes consumed, and periodically report the count of the bytes consumed to a host microprocessor for resynchronizing the system.

In still another aspect, the present invention is directed to program instructions executable by multiple processors of an embedded multimedia system, the program instructions upon execution being operable to decode an audio bitstream, count bytes consumed during decoding, report the count of the bytes consumed and resynchronize the system based on the count of the bytes consumed.

BRIEF DESCRIPTION OF THE DRAWINGS

The foregoing summary, as well as the following detailed description of preferred embodiments of the invention, will be better understood when read in conjunction with the accompanying drawings. For the purpose of illustrating the invention, there is shown in the drawings embodiments which are presently preferred. It should be understood, however, that the invention is not limited to the precise arrangement shown. In the drawings.

DETAILED DESCRIPTION OF THE PREFERRED EMBODIMENTS

While this invention is susceptible of embodiments in many different forms, this specification and the accompanying drawings disclose only some forms as examples of the use of the invention. The invention is not intended to be limited to the embodiments so described, and the scope of the invention will be pointed out in the appended claims.

The preferred embodiment of the embedded multimedia system according to the present invention is described below with a specific application to a variable length coding scheme. The multimedia system may employ a media play back application. The audio decoder may be compatible with windows media audio, an advanced audio coding (AAC) decoder, an AAC Plus decoder, an enhanced AAC plus decoder (eAAC+), MP3, and Real Audio bitstream formats. However, it will be appreciated by those of ordinary skill in the art that the present invention is also well adapted for other types of audio decoders including for Game Audio applications.

Figure 1:
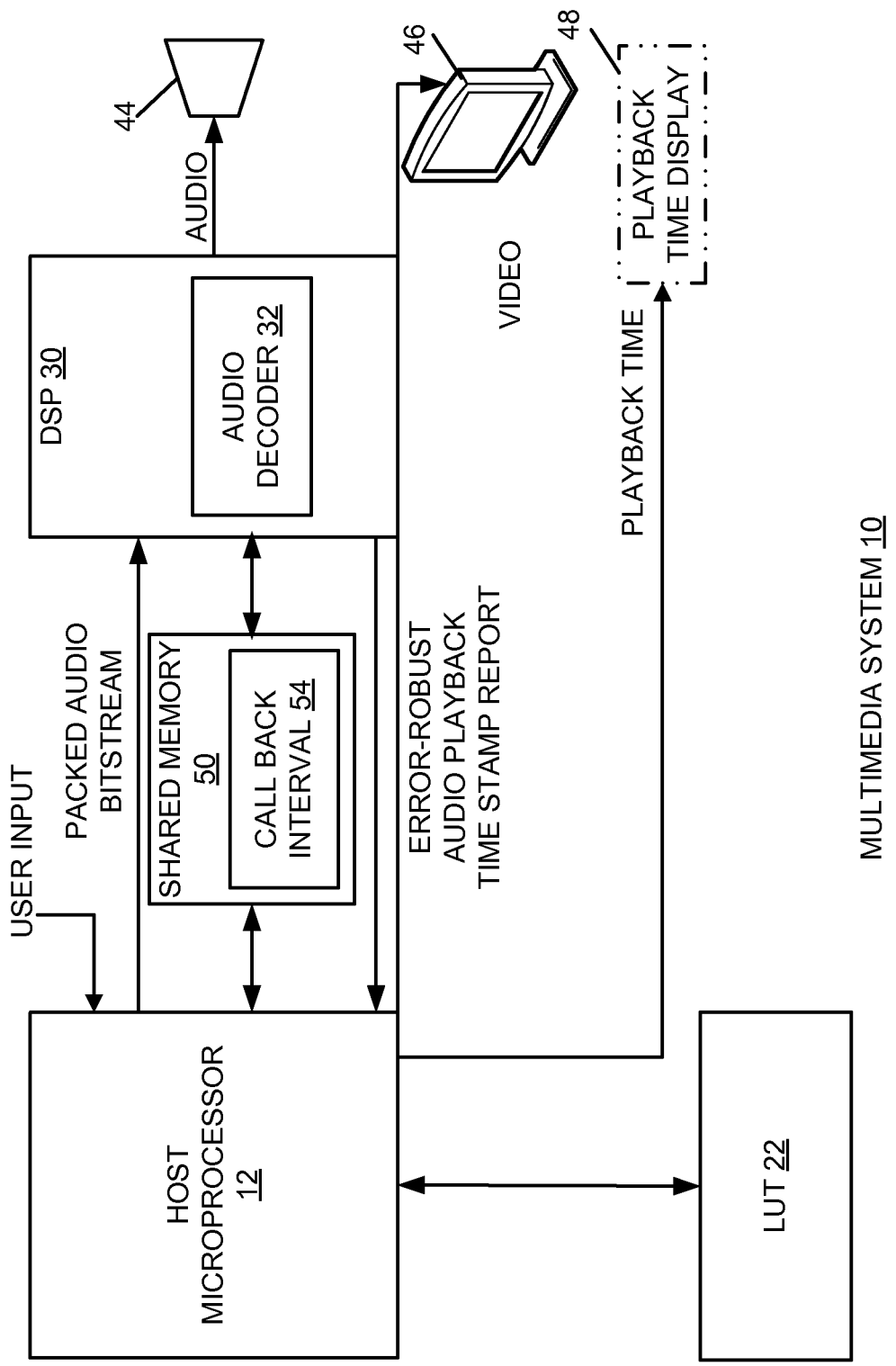
FIG. 1 illustrates a block diagram of a multimedia system in accordance with the present invention.
Figure 2A:
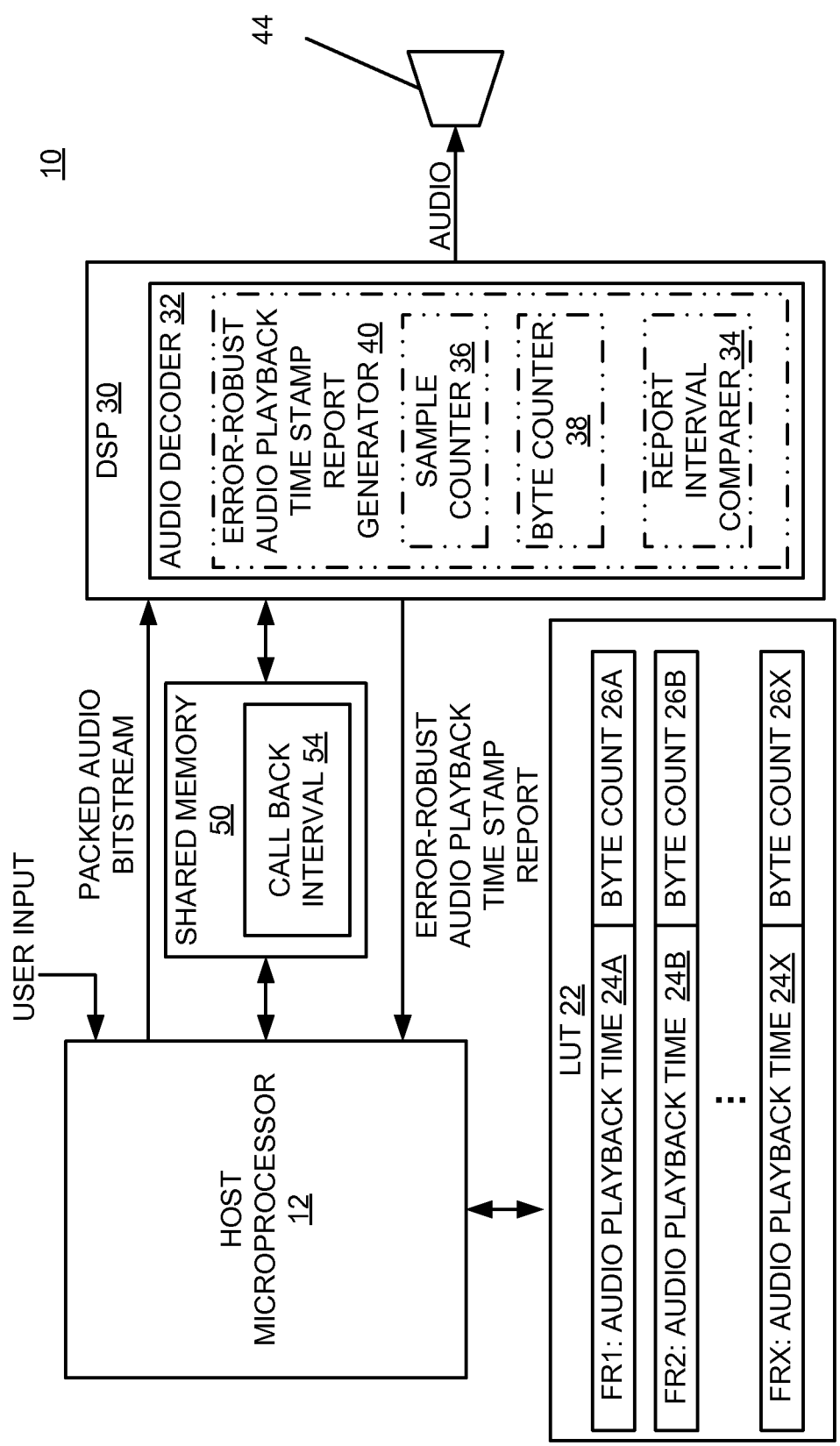
FIG. 2A illustrates a block diagram of the multimedia system in FIG. 1 with details of the audio decoder shown in phantom.
Figure 2B:
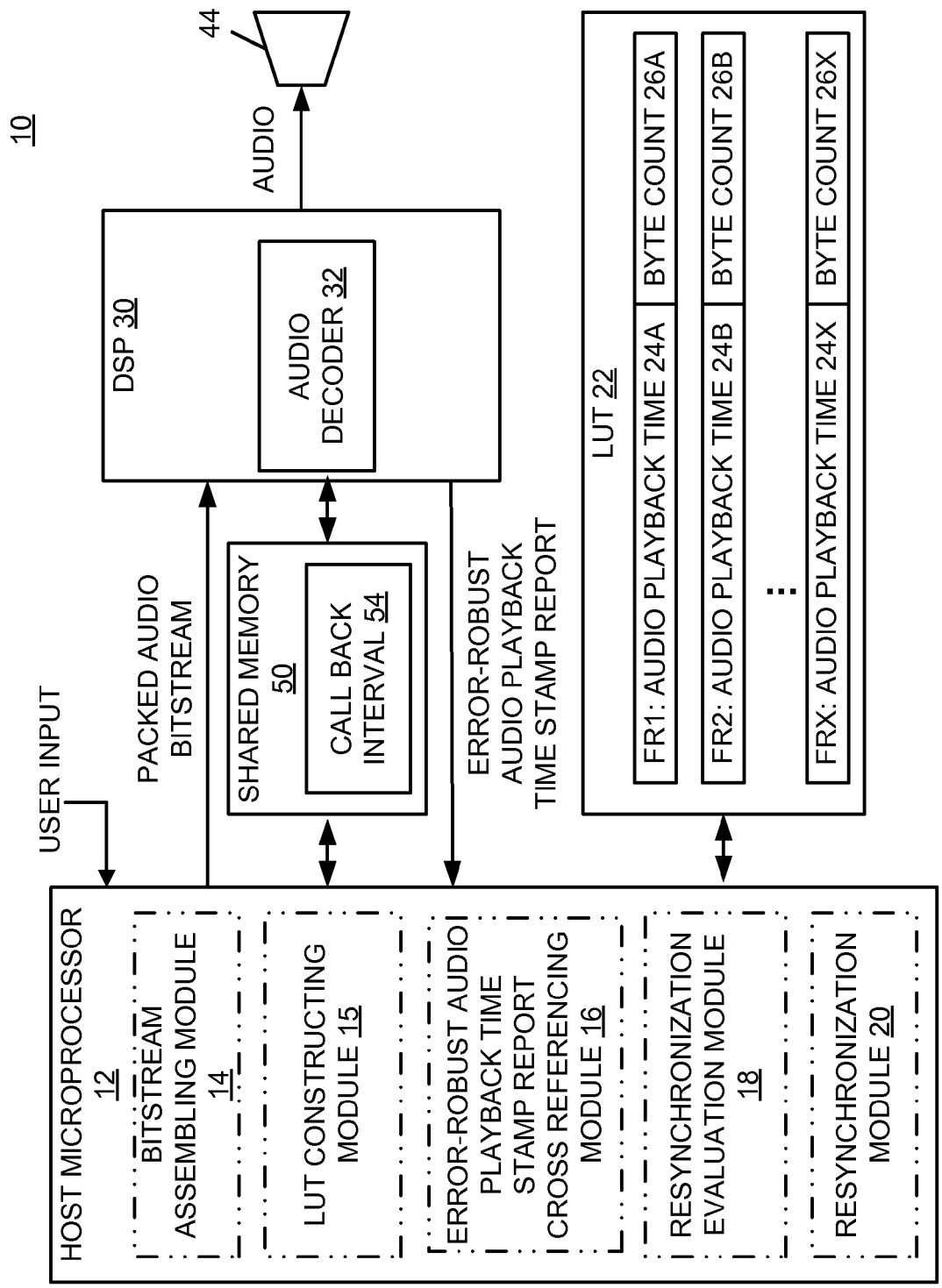
FIG. 2B illustrates a block diagram of a multimedia system in FIG. 1 with details of the host microprocessor shown in phantom.

Referring now to the drawings in detail, wherein like numerals are used to indicate like elements throughout, there is shown in FIGS. 1 and 2A-2B an embodiment of an embedded multimedia system, generally designated at 10, according to the present invention.

In general, the embedded multimedia system 10 includes a plurality of media outputs such as audio through speaker 44 and video through video display 46. The system 10 further outputs a playback time display 48 (shown in phantom) which may be integrated in or separate from the video display 46. While the embedded multimedia system 10 illustrated includes both audio and video, any one user-selected program may include only audio or both audio and video.

In the embedded multimedia system 10, the host microprocessor 12 includes program instructions which assemble a packed audio bitstream in a bitstream assembling module 14 and sends the packed audio bitstream to the audio decoder 32 in the DSP 30, as best seen in FIG. 2B. The audio decoder 32 includes program instructions which decodes the packed audio bitstream into a waveform which is played out through speaker 44. In general, each frame in the packed audio bitstream of a program has associated therewith a predetermined audio playback time and byte count which is constructed by a Look-Up-Table (LUT) constructing module 15 and subsequently stored in a Look-Up-Table (LUT) 22.

In the exemplary embodiment, the predetermined audio playback times for the frames FR1, FR2 . . . FRX of a program are denoted as 24A, 24B, . . . 24X. Furthermore, the LUT 22 has a predetermined byte count 26A, 26B, . . . , 26X associated with each frame's predetermined audio playback time 24A, 24B, . . . 24X.

The host microprocessor 12 further includes program instructions operable to function as an error-robust playback time stamp report cross referencing module 16 which cross references the stored predetermined audio playback time 24A, 24B . . . 24X for a particular frame in the LUT 22. Moreover for resynchronization operations, the host microprocessor 12 further includes program instruction operable as a resynchronization evaluation module 18 and a resynchronization module 20.

The audio decoder 32 includes program instructions operable to function as an error-robust audio playback time stamp report generator 40. The error-robust audio playback time stamp report generator 40 includes a report interval comparer 34, sample counter 36, and a byte counter 38, as best seen in FIG. 2A.

The report interval comparer 34 compares a call back interval 54 with time so that the error-robust audio playback time stamp report generator 40 can send the report. The report interval comparer 34 may receive and extract one or more of a call back intervals 54 stored in shared memory 50, the call back interval 54 being written by the host microprocessor 12. The audio decoder 32 can use the call back interval for use throughout the program.

The error-robust audio playback time stamp report generator 40 creates an error-robust audio playback time stamp report which is sent to the host microprocessor 12. The error-robust audio playback time stamp report includes a sample count from the sample counter 36 and the byte count from the byte counter 38.

In operation, the host microprocessor 12 will set and/or send a call back interval 54 in terms of a number (N) of audio samples played out to instruct the audio decoder 32 as to how frequently the error-robust audio playback time stamp report should be sent back to the host microprocessor 12. The call back interval 54 can be used to assist the host microprocessor 12 in constructing the LUT 22 by the LUT constructing module 15. The audio decoder 32 extracts the call back interval 54 from the shared memory 50. Alternately, the call back interval 54 may be sent in a host command to the DSP 30. Furthermore, the audio decoder 32 keeps track of how many bytes of the bitstream are consumed in byte counter 38, and how many samples are decoded/sent out to the speaker 44 via the sample counter 36. The error-robust audio playback time stamp report generator 40 reports back both the sample count of the sample counter 36 and the byte count of byte counter 38 at the requested call back interval 54 or integer multiples of the call back interval 54.

The host microprocessor 12 maintains a look up table (LUT) 22 that maps the number of bitstream bytes (byte count) 26A, 26B, . . . , 26X with the predetermine audio playback time 24A, 24B, . . . , 24X from the start of the playback. When the host microprocessor 12 receives the error-robust audio playback time stamp report, the host microprocessor 12 recognizes that the number of samples may not be an accurate indication of timing due to the possibility of at least one bitstream error. Therefore, the host microprocessor 12 uses the number of bytes consumed (byte count) from the report to index into the LUT 22 to find the predetermined audio playback time 24A, 24B, . . . , 24X. Preferably, the "index into the LUT 22" should use a closest match search to find the entry in the LUT 22 that is the closest to the byte count sent in the report, since any errors in the packed audio bitstream may result in the byte count being temporarily not aligned with a frame boundary.

With the byte count and sample count known, the host microprocessor 12 can determine where the audio is in playout and syncs up at least one of the audio, the video to associated with the audio, and playback time display.

When a command for the media (audio or video) playback to rewind, fast forward or stop is received, the host microprocessor 12 instructs the audio decoder 32 to do so by sending a corresponding command. The audio decoder 32 will reset the sample and byte counters 36 and 38. Furthermore, the host microprocessor 12 will re-construct the LUT 22 via the LUT constructing module 15. Sample and byte commands may be used to reset the sample and byte counters 36 and 38 to zero. Alternately, the sample and byte commands may simply advance forward or backward, the sample and byte counters 36 and 38.

Figure 5:
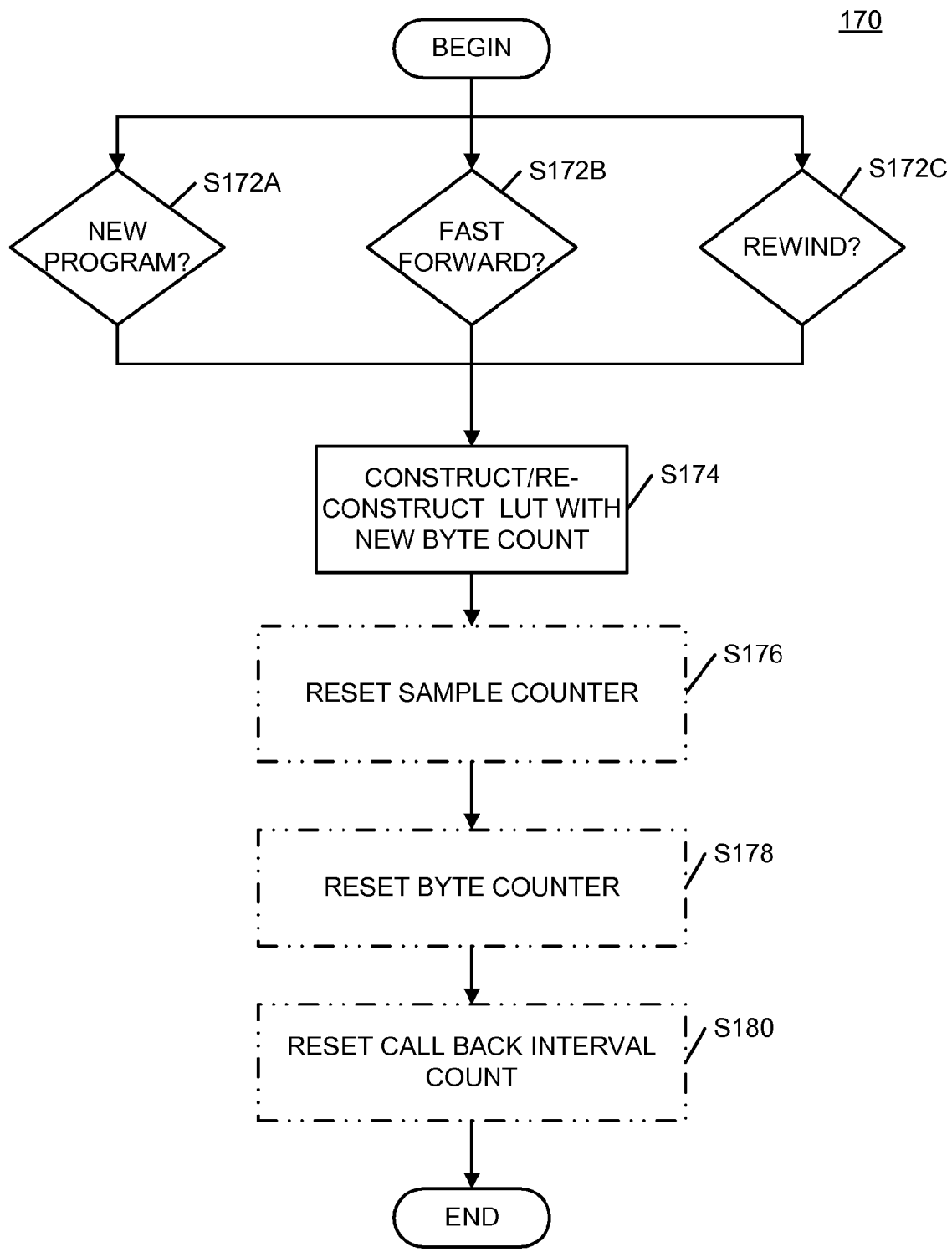
FIG. 5 illustrates a flowchart of the host microprocessor control for the error robust audio playback time stamp reporting method in accordance with the present invention.

The host microprocessor 12 and/or DSP 30 know when to reset the byte/sample counter based on the determinations made at steps S172A, 172B, S172C of FIG. 5. The resynchronization is controlled by the host microprocessor 12 such as to delete a video frame or delay a video frame since the audio playback is in real time and human ears are very sensitive to dropped or added audio samples. With video playback, a frame can be dropped or played twice.

Various bitstream error detecting and handling schemes are available in audio decoders. The audio decoder 32 could either silence out the output or conceal the output pulse code modulation (PCM) when it detects or hits an error bitstream. Since audio decoding has been well established no further explanation of decoding and error handling are set forth.

The error robust audio playback time stamp reporting method 100 and multimedia system 10 take advantage of the fact that the bit stream length remains the same even under hostile channel conditions. The host microprocessor 12 uses the audio byte count to cross reference the predetermined audio playback time through the packed bitstream position at an audio bitstream frame boundary and therefore can determine accurate "actual" audio playback time, regardless of any errors in the bitstream such as for resynchronization of system 10.

Figure 3:
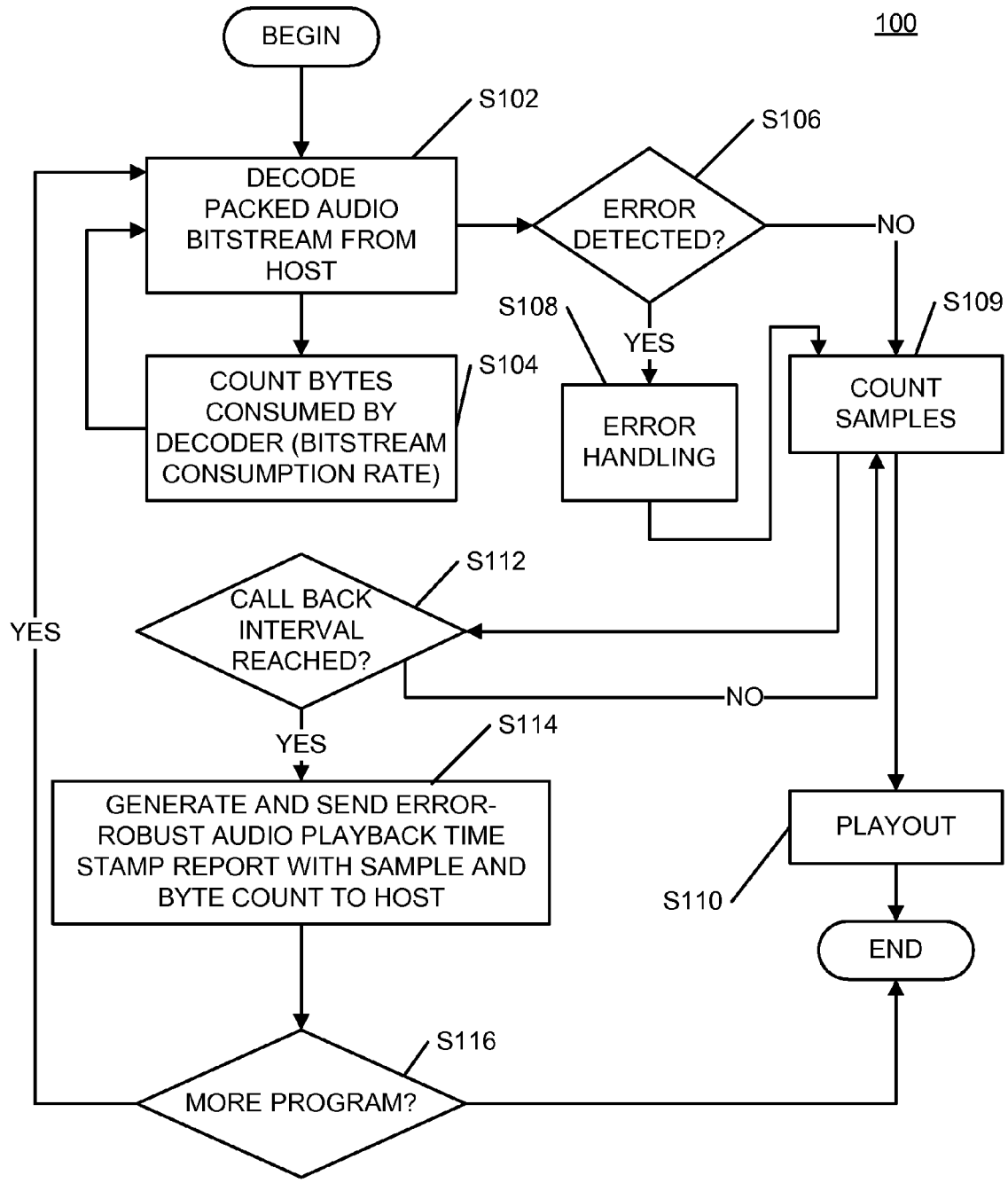
FIG. 3 illustrates a flowchart of an error robust audio playback time stamp reporting method by the audio decoder in accordance with the present invention.
Figure 4:
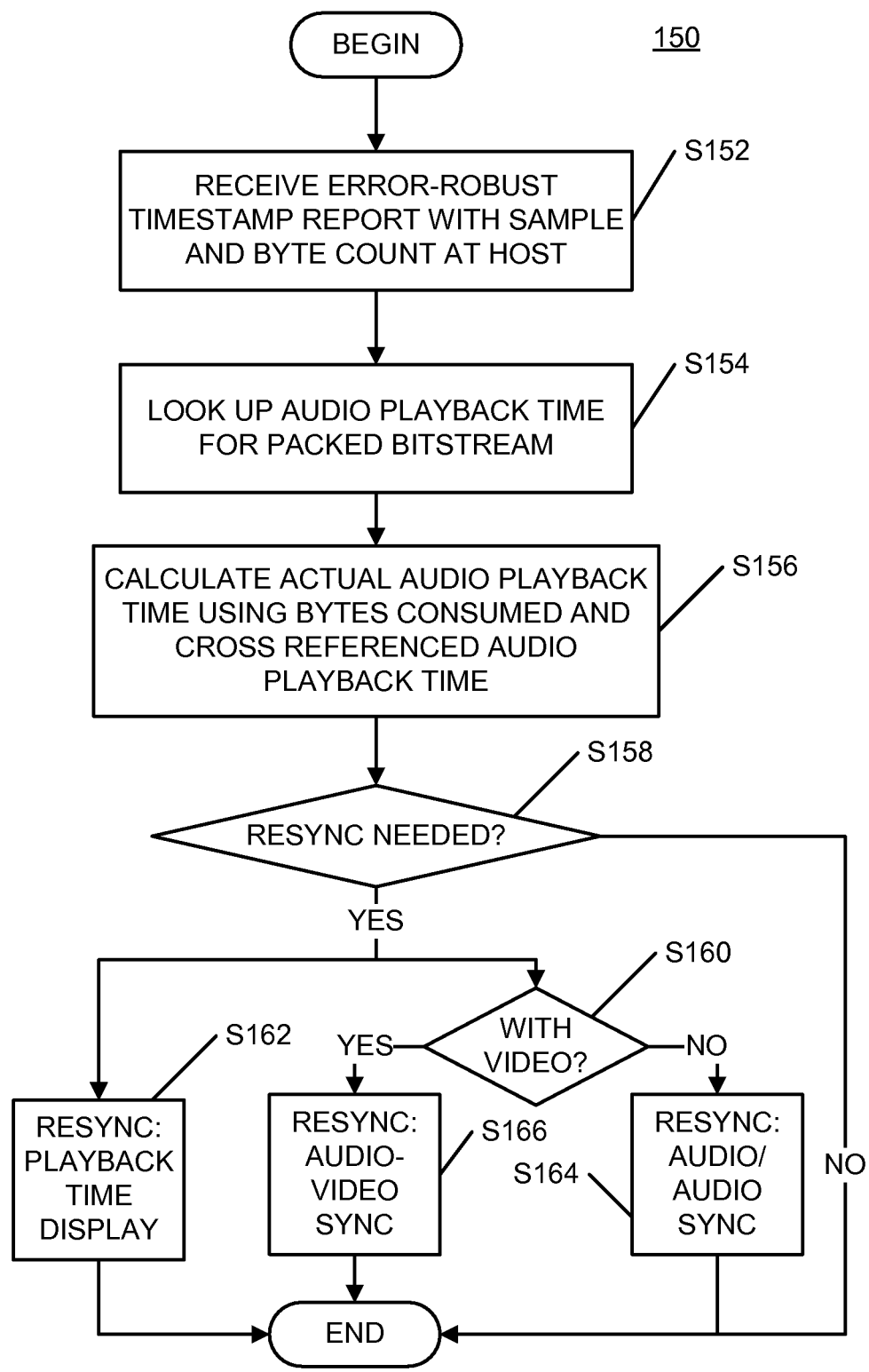
FIG. 4 illustrates a flowchart of the system resynchronization method in accordance with the present invention.

Referring now to FIG. 3, the error robust audio playback time stamp reporting method 100 enables error robust time stamp reporting that can be implemented in embedded multimedia systems 10 to facilitate in the host's resynchronization of the system 10 via method 150 (FIG. 4). The method 100 begins with step S102 where the audio decoder 32 decodes the packed audio bitstream from the host microprocessor 12. Step S102 is followed by steps S104 and S106. At step S104 as decoding takes place, the byte counter 38 counts the bytes consumed by the decoder at step S104. Returning again to step S106, step S106 determines whether an error is detected during the decoding process. If the determination is "NO," step S106 is followed by step S109 where the samples which are played out through speaker 44 at step S110 are counted.

Returning again to step S106, if the determination at step S106 is "YES" (meaning an error has been detected), then step S106 is followed by step S108 where the error is handled using known error correction and handling techniques suitable for the error detected. Step S108 is also followed by step S109 where the samples which are played out at step S110 (step S110 follows step S109) are counted.

As can be appreciated, steps S102, S106, and S108 are part of the decoding process where the audio decoder 32 decodes and corrects or handles bit errors in the received bitstream before being playout (step S110) through the speaker 44.

Returning again to step S109, step S109 is followed by step S112 to determine if the call back interval 54 or an integer multiple of the call back interval 54 has been reached. The call back interval 54 is a function of the sample count. If the determination is "NO," step S112 returns to step S109. If the determination at step S112 is "YES," step S112 is followed by step S114 where the error-robust audio playback time stamp report with the byte and sample counts are sent to the host microprocessor 12. Steps S114 is followed by step S116 where a determination is made whether there is any more programming. If the determination at step S120 is "YES," then step S120 returns to step S102. Otherwise, if the determination is "NO" at step S120, then the method 100 ends.

Referring now to FIG. 4, the system resynchronization method 150 is shown. The method 150 begins with step S152 where the host microprocessor 12 receives the error-robust audio playback time stamp report with the byte count and sample count. Step S152 is followed by step S154 where the predetermined audio playback time 24A, 24B, . . . , 24X for the frame(s) of the packed bitstream is looked up or searched in the LUT 22. The closest match search can be used to find the entry for the predetermined audio playback time which is closest to the byte count. Step S154 is performed by the error-robust playback time stamp report cross referencing module 16.

Step S154 is followed by S156 where the actual audio playback time is calculated using the byte count and the cross referenced predetermined audio playback time. Step S156 is followed by step S158 where a determination is made whether resynchronization is needed based on the result of the calculation in step S156. If the determination is "NO," the method 150 ends. Steps S156 and S158 are performed by the resynchronization evaluation module 18.

On the other hand, if the determination at step S158 is "YES," step S158 is followed by steps S160 and S162. At step S162, the resynchronization module 20 will synchronize the playback time display. At step S160, a determination is made whether the program also includes video. If the determination is "NO," step S160 is followed by step S164 where the audio-audio sync is synchronized. On the other hand, if the determination is "YES" at step S160, the program includes both video and audio. Therefore, the audio-video sync needs to be synchronized at step S166. Steps S162, S164 and S166 end the resynchronization method 150. If resynchronization is done with insertion or delaying of a video frame or other manipulation of the video, the LUT 22 does not need to be modified. Thus, the resynchronization at any point in time of the video would realign the LUT 22 so that the next reporting of the sample count and the byte count would be aligned with the LUT 22 (assuming no error occurred). On the other hand, if resynchronization required an audio frame to be dropped or otherwise manipulated, the LUT 22 may require reconstruction.

The embedded multimedia system 10 may require the synchronization information for other media applications not mentioned above since to mention each specific application would be prohibitive.

Referring now to FIG. 5, a flowchart of the host microprocessor control method 170 of the audio decoder 32 for the error robust audio playback time stamp reporting is shown. The method 170 begins with steps S172A, 172B, and 172C. In operation, the host microprocessor 12 can receive a user command for playback of a new program at step S172A, fast forward the program at step S172B, and rewind the program at step S172C.

Steps S172A, 172B, and/or 172C are followed by step S174 where the host microprocessor 12 constructs or re-constructs the LUT 22 with a new byte count S174 and the predetermined audio playback time 24A, 24B, . . . , 24X associated therewith. Step S174 is followed by step S176 (shown in phantom) where the sample counter 36 is reset. Step S176 (shown in phantom) is followed by step S178 (shown in phantom) where the byte counter 38 is reset. The LUT 22 is constructed using a new or reset byte count. In one embodiment, the sample counter 36 and byte counter 38 may be reset to zero (0) or some other number determined by the host microprocessor 12 and/or DSP 30. Step S178 (shown in phantom) is followed by optional step S180 (shown in phantom) where a call back interval 54 or counter for the call back interval 54 is set or reset. The call back interval 54 can be sent as deemed appropriate. For example, the call back interval 54 at step S180 may only be set when a new program is started for playback and not at other times.

The steps S176 and S178 are shown in phantom to indicate, that as the result of the host microprocessor 12 receiving a user input for a new program selection, fast-forward or rewind, the interface between the host microprocessor 12 and the DSP 30 would cause the sample counter 36, the byte counter 38 to be set or reset. Likewise, the call back interval 54 may be set or reset. Moreover, the resetting of the sample counter 36 and the byte counter 38 may also be done automatically by the DSP 30.

In the embodiment of FIGS. 1, 2A, and 2B, the interface between the host microprocessor 12 and the DSP 30 to communicate the call back interval 54 is a shared memory 50. In this embodiment, the host microprocessor 12 would write the call back interval 54 in the shared memory 50. The DSP 30 would read the call back interval 54 from the shared memory 50 for use by the error-robust audio playback time stamp report generator 40. Alternately, the interface between the host microprocessor 12 and the DSP 30 to communicate the call back interval 54 could be a command sent from the host microprocessor 12 to the DSP 30.

Figure 6:
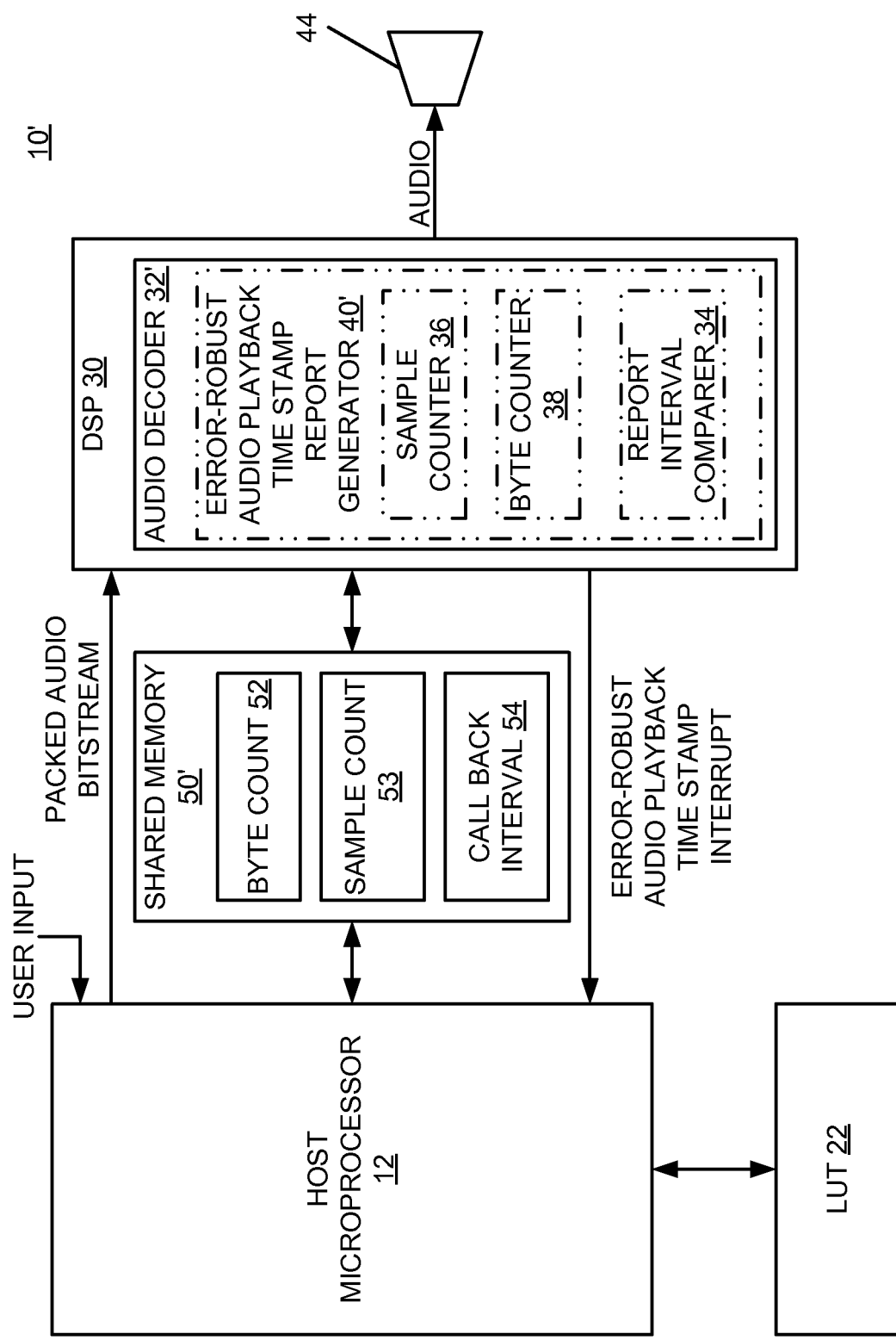
FIG. 6 illustrates a block diagram of an alternate embodiment of the multimedia system in accordance with the present invention with details of the audio decoder shown in phantom.

Referring now to FIG. 6, a block diagram of an alternate embodiment of the multimedia system 10' with details of the DSP 30 (shown in phantom) is shown. In this embodiment, the interface between the host microprocessor 12 and the DSP 30 to communicate the call back interval 54 is a shared memory 50'. The interface between the DSP 30 to the host microprocessor 12 to send the sample count 52 and the byte count 53 of the error-robust audio playback time stamp report includes writing, by the audio decoder 32', the sample count 52 and the byte count 53 in memory locations of the shared memory 50'. The host microprocessor 12 would read the sample count 52 and the byte count 53 from the shared memory 50'. Furthermore, the error-robust audio playback time stamp report generator 40' sends an error-robust audio playback time stamp interrupt to the host microprocessor 12. The interrupt notifies the host microprocessor 12 of the availability of the sample count 52 and the byte count 53 in the shared memory 50'.

In view of the above, the present invention provides an error robust reporting method and embedded multimedia system 10 which achieves accurate time stamp reporting back to the host microprocessor for system synchronization. The method and system 10 also compensate for the cumulative nature of error in an audio bitstream to synchronize the system.

It will be appreciated by those of ordinary skill in the art that by the embedded multimedia system, method and program instructions disclosed herein, the error robust reporting achieves accurate time stamp reporting and compensates for the cumulative nature of errors in an audio bitstream. The error robust reporting also compensates for the cumulative nature of errors when the protocol does not require re-transmission. For example, the protocol may be the UDP Lite or other "best-effort" (un-reliable) protocols. The error robust reporting also allows improved synchronization.

The foregoing description of the embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:
1. A multimedia system having multiple processors comprising:
an audio decoder operable to
decode an audio bitstream of a program,
count bytes consumed by the audio decoder, and
report the count of the bytes consumed; and
a host microprocessor operable to
send the audio bitstream to the audio decoder,
receive the count of the bytes consumed, select a predetermined byte count stored in a look-up table (LUT) based on the count of bytes consumed,
retrieve from the LUT a predetermined playback time associated with the predetermined byte count, and
resynchronize the system based on the predetermined playback time,
wherein the host microprocessor comprises:
the LUT storing the predetermined byte count and the predetermined playback time associated with the predetermined byte count;
an error-robust playback time stamp report cross referencing module which cross references the count of the bytes consumed and the predetermined byte count indexed in the LUT; and
a LUT constructing module for constructing the LUT for the program.

2. The system of claim 1, wherein the audio decoder further comprises a sample counter operable to count a number of decoded samples of the audio bitstream played out by a speaker.

3. The system of claim 2, wherein the audio decoder further comprises an error-robust audio playback time stamp report generator operable to generate the report, the report further comprising the count of the sample counter.

4. The system of claim 3, further comprising a shared memory,
wherein the host microprocessor includes a bitstream assembling module operable to assemble and communicate a bitstream, and write a call back interval in the shared memory for use by the audio decoder, the call back interval being a function of the number of the decoded samples and indicating a frequency in which the report is sent to the host microprocessor, and
wherein the error-robust audio playback time stamp report generator writes the count of the sample counter and the bytes consumed of the report in the shared memory for use by the host microprocessor.

5. The system of claim 1, wherein the host microprocessor is responsive to a user input command to fast forward, rewind, or stop, wherein in response to the user input command to fast forward or rewind, the host microprocessor is operable to reconstruct the LUT and the audio decoder is operable to reset the bytes consumed.

6. The system of claim 1, wherein the audio decoder is further operable to interface with the host microprocessor to receive a call back interval and reset the bytes consumed.

7. The system of claim 1, wherein when the host microprocessor resynchronizes the system, a playback time display indicative of an audio playout of the decoded audio bitstream is resynchronized.

8. The system of claim 1, wherein when the host microprocessor resynchronizes the system, a video stream related to the audio bitstream is resynchronized.

9. The system of claim 1, wherein the audio decoder includes program instructions executed by a digital signal processor (DSP) and the host microprocessor includes program instructions executed by an Advance RISC Machine (ARM).

10. The system of claim 1, wherein the audio decoder is compatible with at least one of windows media audio, an advanced audio coding (AAC) decoder, an AAC Plus decoder, an enhanced AAC plus decoder (eAAC+), MP3, and Real Audio bitstream formats.

11. A multimedia system comprising:
decoding means for decoding an audio bitstream of a program, counting bytes consumed during decoding and reporting the count of the bytes consumed; and
processing means for sending the audio bitstream to the decoding means, selecting a predetermined byte count stored in a look-up table (LUT) based on the count of bytes consumed, retrieving from the LUT a predetermined playback time associated with the predetermined byte count, and resynchronizing the system based on the predetermined playback time,
wherein said processing means comprises:
the LUT storing the predetermined byte count and the predetermined playback time associated with the predetermined byte count;
cross referencing means for cross referencing the count of the bytes consumed and the predetermined byte count indexed in the LUT; and
constructing means for constructing the LUT for the program.

12. The system of claim 11, wherein the decoding means further comprises sample counting means for counting a number of decoded samples of the audio bitstream played out.

13. The system of claim 12, wherein the decoding means further comprises reporting means for reporting the count of the sample counting means.

14. The system of claim 13, further comprising storing means for storing a call back interval,
wherein the processing means includes means for assembling and communicating a bitstream and writing the call back interval to the storing means for use by the decoding means, the call back interval being a function of the number of the decoded samples and indicating a frequency in which the reporting means writes the count of the sample counting means and the bytes consumed to the storing means for use by the processing means.

15. The system of claim 11, wherein the processing means is responsive to a user input command to fast forward, rewind, or stop, wherein the constructing means comprises reconstructing means for reconstructing, in response to the user input command to fast forward or rewind, the LUT, and wherein the decoding means comprises resetting means for resetting, in response to the user input command to fast forward or rewind, the bytes consumed.

16. The system of claim 11, wherein the decoding means comprises interfacing means for interfacing with the processing means to receive a call back interval and reset the bytes consumed.

17. The system of claim 11, wherein the processing means comprises resynchronizing means for resynchronizing a playback time display indicative of an audio playout of the decoded audio bitstream.

18. The system of claim 11, wherein the processing means comprises resynchronizing means for resynchronizing a video stream related to the audio bitstream.

19. The system of claim 11, wherein the decoder means is compatible with at least one of windows media audio, an advanced audio coding (AAC) decoder, an AAC Plus decoder, an enhanced AAC plus decoder (eAAC+), MP3, and Real Audio bitstream formats.

20. A method of resynchronizing a multimedia system comprising:
sending, with a host microprocessor, an audio bitstream of a program to an audio decoder;
decoding, with the audio decoder, the audio bitstream;
counting, with the audio decoder, bytes consumed during the decoding;
reporting, with the audio decoder, a count of the bytes consumed to the host microprocessor;

selecting, with the host microprocessor, a predetermined byte count stored in a look-up table (LUT) based on the count of bytes consumed;

retrieving, with the host microprocessor, from the LUT a predetermined playback time associated with the predetermined byte count; and resynchronizing, with the host microprocessor, the system based on the predetermined playback time, wherein the LUT stores the predetermined byte count and the predetermined playback time associated with the predetermined byte count, and wherein said method further comprises, prior to the decoding, constructing the LUT for the program.

21. The method of claim 20, further comprising:
during the decoding, counting a number of decoded samples of the audio bitstream played out.

22. The method of claim 21, wherein reporting, with the audio decoder, the count of the bytes consumed comprises reporting a count of the number of decoded samples.

23. The method of claim 22, further comprising:
assembling and communicating a bitstream; and
setting a call back interval for use during the decoding, wherein the call back interval is a function of the number of the decoded samples and indicates a frequency of the reporting.

24. The method of claim 23, wherein reporting, with the audio decoder, the count of the bytes consumed comprises writing the bytes consumed and the count of the samples decoded by the audio decoder in memory for use by the host microprocessor.

25. The method of claim 20, wherein resynchronizing, with the host microprocessor, the system comprises resynchronizing a playback time display indicative of an audio playout of the decoded audio bitstream.

26. The method of claim 20, wherein resynchronizing, with the host microprocessor, the system comprises resynchronizing a video stream related to the audio bitstream.

27. The method of claim 20, wherein the audio decoder is compatible with at least one of windows media audio, an advanced audio coding (AAC) decoder, an AAC Plus decoder, an enhanced AAC plus decoder (eAAC+), MP3, and Real Audio bitstream formats.

28. A non-transitory computer-readable medium storing instructions executable by multiple processors of an embedded multimedia system, the instructions upon execution being operable to:
send, with a host microprocessor, an audio bitstream of a program to an audio decoder;
decode, with the audio decoder, the audio bitstream;
count, with the audio decoder, bytes consumed during decoding;
report, with the audio decoder, the count of the bytes consumed to a host microprocessor;
receive, with the host microprocessor, the count of the bytes consumed;
select, with the host microprocessor, a predetermined byte count stored in a look-up table (LUT) based on the count of bytes consumed;
retrieve, with the host microprocessor, from the LUT a predetermined playback time associated with the predetermined byte count; and
resynchronize, with the host microprocessor, the system based on the predetermined playback time,
wherein said instructions upon execution are further operable to:
construct the LUT for the program, wherein the LUT stores the predetermined byte count and the predetermined playback time associated with the predetermined byte count; and
cross reference the count of the bytes consumed and the predetermined byte count indexed in the LUT.

29. The computer-readable medium of claim 28, wherein the program instructions are further operable upon execution to count a number of decoded samples of the audio bitstream played out by a speaker.

30. The computer-readable medium of claim 29, wherein the program instructions operable to report are further operable upon execution to report the count of the number of decoded samples.

31. The computer-readable medium of claim 28, wherein the program instructions upon execution are further operable to assemble and communicate a bitstream and write a call back interval to memory, wherein the call back interval is a function of the number of the decoded samples and indicates a frequency in which a report is sent to the host microprocessor by the instructions operable to report.

32. The computer-readable medium of claim 28, wherein the program instructions upon execution are responsive to a user input command to fast forward, rewind, or stop, wherein in response to the user input command to fast forward or rewind, the program instructions upon execution are operable to reset the count of the bytes consumed and reconstruct the LUT.

33. The system of claim 1, wherein said count of the bytes consumed indicates a rate at which the audio bitstream is consumed by the audio decoder.

34. The system of claim 1, wherein said bytes consumed includes bytes of a packet of the audio bitstream in which at least one bit error is encountered.

35. The system of claim 1, wherein a plurality of predetermined byte counts are stored in said LUT, and
wherein said host microprocessor is operable to select said predetermined byte count by finding the predetermined byte count, among said plurality of predetermined byte counts, that is closest to said count of bytes consumed.

36. The system of claim 11, wherein said count of the bytes consumed indicates a rate at which the audio bitstream is consumed by the audio decoder.

37. The system of claim 11, wherein said bytes consumed includes bytes of a packet of the audio bitstream in which at least one bit error is encountered.

38. The system of claim 11, wherein a plurality of predetermined byte counts are stored in said LUT, and
wherein said processing means is operable to select said predetermined byte count by finding the predetermined byte count, among said plurality of predetermined byte counts, that is closest to said count of bytes consumed.

39. The method of claim 20, wherein said method comprises, in response to a user input command to fast forward or rewind:
reconstructing, with the host microprocessor, the LUT; and
resetting, with the audio decoder, said count of the bytes consumed.

40. The method of claim 20, wherein said count of the bytes consumed indicates a rate at which the audio bitstream is consumed by the audio decoder.

41. The method of claim 20, wherein said bytes consumed includes bytes of a packet of the audio bitstream in which at least one bit error is encountered.

42. The method of claim 20, wherein a plurality of predetermined byte counts are stored in said LUT, and wherein said selecting said predetermined byte count comprises finding the predetermined byte count, among said plurality of predetermined byte counts, that is closest to said count of bytes consumed.

43. The non-transitory computer-readable medium of claim 28, wherein said count of the bytes consumed indicates a rate at which the audio bitstream is consumed by the audio decoder.

44. The non-transitory computer-readable medium of claim 28, wherein said bytes consumed includes bytes of a packet of the audio bitstream in which at least one bit error is encountered.

45. The non-transitory computer-readable medium of claim 28, wherein a plurality of predetermined byte counts are stored in said LUT, and wherein said program instructions upon execution are operable to select said predetermined byte count by finding the predetermined byte count, among said plurality of predetermined byte counts, that is closest to said count of bytes consumed.

\* \* \* \* \*